(12) United States Patent
Fryc (10) Patent No.: US 9,946,601 B2
(45) Date of Patent: Apr. 17, 2018

(54) USER INTERFACE STATE SAVING AND RESTORATION

(71) Applicant: Red Hat, Inc., Raleigh, NC (US)

(72) Inventor: Lukas Fryc, Brno (CZ)

(73) Assignee: RED HAT, INC., Raleigh, NC (US)

( * ) Notice: Subject to any disclaimer, the term of this patent is extended or adjusted under 35 U.S.C. 154(b) by 354 days.

(21) Appl. No.: 14/718,181

(22) Filed: May 21, 2015

(65) Prior Publication Data
US 2016/0342478 A1     Nov. 24, 2016

(51) Int. Cl.
*G06F 17/30* (2006.01)
*G06F 11/14* (2006.01)

(52) U.S. Cl.
CPC ...... *G06F 11/1438* (2013.01); *G06F 2201/84* (2013.01)

(58) Field of Classification Search
CPC .................. G06F 11/1438; G06F 2201/84
See application file for complete search history.

(56) References Cited

U.S. PATENT DOCUMENTS

| | | |
|---|---|---|
| 6,792,607 B1 | 9/2004 | Burd et al. |
| 6,961,750 B1 | 11/2005 | Burd et al. |
| 7,096,419 B2 | 8/2006 | Barnes et al. |
| 7,698,628 B2 | 4/2010 | Perelman et al. |
| 8,176,411 B2 | 5/2012 | Palmieri |
| 8,838,679 B2 | 9/2014 | Alev et al. |
| 2003/0195963 A1 | 10/2003 | Song et al. |
| 2011/0191407 A1* | 8/2011 | Fu .............. G06F 8/38 709/203 |

OTHER PUBLICATIONS

Shiju Varghese, Persisting model state in ASP.NET MVC using Serialize HTMLHelper, https://weblogs.asp.net/shijuvarghese/persisting-model-state-in-asp-net-mvc-using-html-serialize, Mar. 6, 2010.*
"Advantage and Disadvantage Save State in Restore View in Client/Server JSF 2" http://slackoverflow.com/questions/16849128/advantage-and-disadvantage-save-state-in-restore-vew-in-client-server-isf-2, May 31, 2013, 1 page.
David Byrne et al. "Beware of Serialized GUI Objects Bearing Data" https://www.blackhat.com/presentations/bh-dc-10/Byrne_David/BlackHat-DC-2010-Byrne-SGUI-slides.pdf, 2010, 32 pages.
Martin Jericho "Persisting the State of a Web Page" http://www.codeproject.com/Arlicles/7655/Persisting-the-stale-of-a-web-page, Mar. 7, 2006, 13 pages.
Danny Weyns et al. "Serialization of Distributed Execution-State in Java" https://lirias.kuleuven.be/bitstream/123456789/124604/1/2003netobjectdays.pdf, 2003, 21 pages.

* cited by examiner

*Primary Examiner* — Jay A Morrison
(74) *Attorney, Agent, or Firm* — Haynes and Boone, LLP (57) ABSTRACT

Methods, systems, and computer program products are included to persist a state of an application to a memory and to restore the state of the application from the memory. The method includes leveraging two-way binding between a model and a view of the application in order to persist at least a portion of the model to the memory as a state. The persisting of the model to the memory may be performed automatically. This state may later be restored and applied to the model. Updates to the model based on the state restoration are propagated to the view, thereby restoring at least a portion of the view to its appearance at the time the model was persisted to the memory.

16 Claims, 4 Drawing Sheets

USER INTERFACE STATE SAVING AND RESTORATION

BACKGROUND

A model-view-controller (MVC) software design pattern is used to divide a software application into three interconnected parts. In some MVC implementations, the model corresponds to the data of an application, the view corresponds to the display of the application, such as a user interface, and the controller corresponds to the behavior of the application. This pattern may also be referred to as model-view-viewmodel (MVVM) or model-view-binder (MVB), that are variations of the MVC pattern in other contexts.

BRIEF SUMMARY

According to an example, a computer-implemented method includes receiving a first data value from a user, the first data value corresponding to an element of a view. The method further includes: propagating the first data value to a property of a model. The method further includes detecting a first event, the first event corresponding to the view. The method further includes identifying one or more properties corresponding to the model, the one or more properties including the property. The method further includes serializing the one or more properties to a memory as a stored model. The method further includes associating the stored model with a state identifier. The method further includes detecting a second event. The method further includes deserializing the stored model, the deserializing including applying one or more data values of the stored model to the one or more properties. The method further includes propagating a data value of the one or more data values to the element of the view.

According to an example, a non-transitory computer-readable medium includes computer-readable instructions, the computer-readable instructions executable by a processor to cause the processor to: propagate a user input from a first element of a view to a first property of a model. The instructions further executable to cause the processor to: detect a first event and trigger a persist state operation, the persist state operation including: identifying one or more properties corresponding to an active model, the one or more properties including the first property; storing the one or more properties in a memory as a state, the storing including serializing the one or more properties; and associating the state with a state identifier. The instructions further executable to cause the processor to: detect a second event and trigger a restore state operation, the restore state operation including: applying the state to the model, the applying including deserializing the state to obtain the one or more properties; and propagating the one or more properties to one or more elements of the view, the one or more elements including the first element.

According to an example, a system includes a processor and a memory. The system further includes an application including a model, a view, and a two-way binding between the model and the view. The system includes the view to receive a user input. The system includes the model to store the user input as a first property. The application further includes a state manager. The state manager is executed by the processor to: retrieve one or more properties of the model; the one or more properties including the first property; serialize and store the one or more properties in the memory as a state; and deserialize the one or more properties from the memory, wherein the deserializing includes applying the one or more properties to the model.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
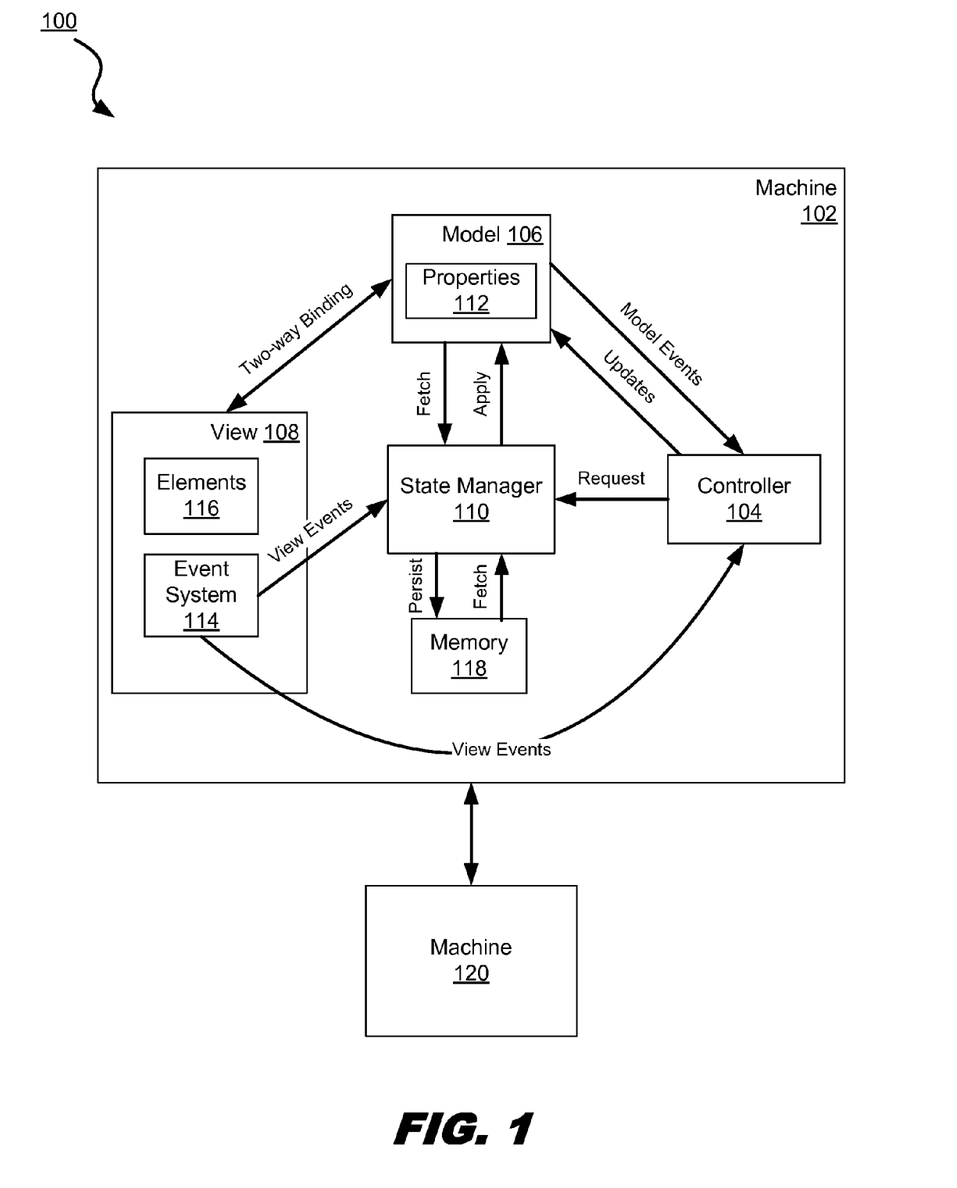
FIG. 1 is a block diagram illustrating a state manager architecture, in accordance with various examples of the present disclosure.

FIG. 1 illustrates a state manager architecture 100, in which examples of the present disclosure can be implemented.

System architecture 100 includes a machine 102, such as a computing device that includes hardware, software or a combination of both hardware and software. The machine 102 includes an application that is structured as a controller 104, a model 106 and a view 108. The controller 104, model 106 and view 108 are communicatively coupled. In the present example, the controller 104, model 106 and view 108 are structured as software components of a software application. In the present example, the application is stored in a memory (e.g., memory 118 and/or any other memory) of the machine 102, and executed by one or more processors of the machine 102.

In some examples, the functionality of the controller 104 and the view 108 is structured in a single component. In other examples, the controller 104 and the model 106 are structured in a single component (such as in a MVVM pattern). In yet other examples, intermediary components may be utilized, such as a ViewModel in a MVVM pattern that includes two-way data binding.

In the present example, the controller 104 is structured to react to events and input that is received. For example, the event system 114 is structured to send view 108 events to the controller 104. The controller 104 is structured to store behavior of the application, such as methods that are executed to process view 108 events, and update the model 106 and view 108 accordingly. For example, data may be input into a view 108 of an application using an input device. In some examples, an input device is a device such as a keyboard, mouse, touchpad, network interface and so forth. Data that is input into the view 108 may trigger a view 108 event that is received and processed by the controller 104. Processing may include, for example, parsing the input, sending an update to the model 106 corresponding to the input, updating user interface elements of the view 108, sending a request to the state manager 110 to save the state of the application, sending a request to the state manager 110 to load the state of the application, and so forth.

In the present example, the model 106 is structured to store data of the application. In some examples, the model 106 includes objects, such as objects that are instances of JavaScript objects, where the objects include properties 112 that are associated with data values. In some examples, properties 112 are variables that are defined for the model 106 to store particular data values corresponding to one or more user interface elements of the view 108. In the present example, properties of the model 106 may be updated based on input received and processed by the controller 104. In some examples, the objects of the model 106 also include methods that may be called. In the present example, the model 106 is structured to send events to the controller 104. Model 106 events may track changes to the model, such as changes that were made by updating the view and propagating those changes to the model via a two-way binding. These events from the model 106 may be sent to the controller 104 for processing. In some examples, the model 106 is structured to have model 106 events detected by a model change listener. In other examples, the model 106 is structured to have model 106 events detected by dirty-checking.

In the present example, the view 108 includes one or more elements 116, such as user interface elements, that are displayed. Examples of user interface elements include windows, text boxes, labels, buttons, and so forth. User interface elements may include any graphical elements of the application that may be displayed. The view 108 is structured for the user to interact with the elements 116, such as by "clicking" the elements, typing alphanumerical text into the elements, reading and scrolling the elements, and so forth.

In the present example, the view 108 is structured with an event system 114. The event system 114 includes an event handler, to detect and handle events and/or input corresponding to the view 108. The event system 114 is structured to send events to the state manager 110 and/or the controller 104. In some examples, the events are handled by the controller 104, which is structured to receive and/or detect the events, and process the events to determine which actions to trigger, if any. In some examples, events are handled by the state manager 110, which is structured to automatically store and/or restore the state of the application based on the particular event received.

For example, a view 108 may include a text box element and a button element. A user may input text into the text box element using an input device. The entering of text into the text box, in this example, triggers a view 108 event, which propagates the text to the model 104 in order to update the property associated with the text box to include the entered text. Accordingly, as text is entered, the text box element of the view displays the entered text.

In this example, after entering the input, the user selects the button element, which triggers at the view 108 a button onClick event corresponding to the particular button. The controller 104, in this example, receives the onClick event and a button identifier associated with the event and executes a method corresponding to the onClick event of the particular button. In this example, the method is structured to clear the text box. Accordingly, the controller 104 sends an update to the model 106 to set the property of the model 106 that is associated with the text box to an empty string " ". The model 106 propagates this update to the view 108, such that the view 108 displays the text box as empty.

In another example, if a user selects a "close window" button, an event is sent from the event system 114 to the controller, which detects and processes the event and requests that the model 106 update a data value corresponding to the window open/close status. The model 106 updates the window status and propagates the window status update to the view 108. Accordingly, the view 108 is updated to remove the window from the user's display.

In the present example, the state manager 110 is structured to manage state saving and state restoring. The state manager 110 is communicatively coupled to the controller 104, the model 106 and the view 108. The state manager 110 is structured to receive requests from the controller 104. For example, a user request to save or restore a state may be input via an input device and received by the controller 104. The controller 104 is structured to send any input that is received in a request to the state manager 110, such that the state manager 110 may process the request and determine whether the state should be saved or restored.

The state manager 110 is structured to detect requests and determine, for each request, whether the request is a trigger for a save state operation or a restore state operation. In some examples, the state manager 110 may compare the request with one or more triggers to determine whether the request is a match. In other examples, requests may be associated with a specific request property when the save state operation is triggered (such as the XMLHttpRequest property). The request property may be later decoded when response is received in order to perform a restore state operation. The state manager 110 may also be structured to parse the request to determine a state identifier associated with the request, in order to determine a particular state to save or restore. For example, if there are a plurality of states that are stored, the state manager 110 is structured to determine a particular state to restore, based on a matching between the state identifier associated with a stored state and a state identifier associated with the request.

The state manager 110 is structured to detect events and determine whether each event is a trigger for a save state operation or a restore state operation. In some examples, the state manager 110 may compare the event with one or more triggers to determine whether the event is a match. In other examples, events may be associated with specific event handlers that trigger a save state operation or a restore state operation based on the trigger being coded into the event handler. The state manager 110 may also be structured to parse the event to determine a state identifier associated with the event, in order to determine a particular state to save or restore. For example, if there are a plurality of states that are stored, the state manager 110 is structured to determine a particular state to restore, based on a matching between a state identifier associated with a stored state and a state identifier associated with the event.

The state manager 110 is structured to save a state by fetching the properties 112 of the model 106. The state manager 110 is structured to serialize the properties and to store the serialized properties in a memory 118. In the present example, the serialized properties are persisted/stored in the memory. The state manager 110 is structured to restore a state by fetching serialized properties from the memory 118, deserializing the serialized properties, and applying the deserialized properties to the properties 112 of the model 106. In some examples, deserialized properties are applied to the model's properties 112 by overwriting the properties 112.

In some examples, storing or persisting a state refers to writing the properties and/or data values corresponding to the properties of the model to a memory. In other examples, storing or persisting a state includes serializing the properties and/or data values.

In some examples, restoring the state refers to reading/fetching data values and/or properties from the memory and writing those data values and/or properties into the model. In other examples, restoring the state includes deserializing the properties and/or data values.

In the present example, the state manager 110 is also structured to clear a state from a memory in order to free space in the memory. In some examples, the state manager 110 is structured to clear a state from the memory based on any of the following: (i) a state restore being triggered (after restoring the state, clear the state); (ii) a request property (such as a when a server response indicates a success); (iii) model events or view events; and/or (iv) garbage collection (e.g., based on time properties).

In some examples, this is performed by removing a state after a state is restored from the memory. In other examples, a state may be removed from the memory based on a request property (such as a when a server response indicates that a transaction was successfully processed).

In the present example, the view 108 is structured with a binding, such that updates to the elements 116 of the view 108 are propagated to the properties 112 of the model 106. Similarly, the model 106 is structured with a binding, such that updates to the properties 112 of the model 106 are propagated to the elements 116 of the view. The binding may be referred to as a "two-way binding" because the binding maps the elements 116 to the properties 112 and vice-versa.

In some examples, a two-way binding is structured as a method that observes changes from properties 112 or elements 116. In some examples, an observed change triggers an asynchronous update of the corresponding property/element, thereby propagating the update. In other examples, the two-way binding may be structured to include "dirty-checking." Dirty-checking may be accomplished by checking all properties and elements for changes, and making the corresponding updates to the elements/properties, thereby propagating the changes.

In some examples, propagating a change refers to overwriting a data value associated with an element with a data value associated with a property and/or overwriting a data value associated with a property with a data value associated with an element.

The memory 118 is structured to store data corresponding to the model 106 and the view 108. In some examples, the memory 118 is a runtime memory. In other examples, the memory 118 is a persistent memory. In yet another example, a memory 118 may comprise both a runtime memory and a persistent memory, such that one or more states may be stored in different memory types. The memory 118 is structured to store a plurality of states, which each may be associated with a state identifier. In some examples, memory 118 is structured as a database. The database may be any type of database, such as one or more flat files, SQL databases, XML databases, and variants and combinations thereof. For example, a database may be a relational database or a non-relational database. In some examples, state identifiers are stored in the database as keys and stored states (and the properties included in the states) are stored in the database as values associated with the keys.

In the present example, machine 120 is another machine, such as a client, server or peer that interacts with the machine 102. For example, an application running on the machine 102 may send data to the machine 120, which processes the data and returns a response to the machine 102. In the present example, the controller 104 is structured to receive input from the machine 120 and/or output data to the machine 120.

Figure 2:
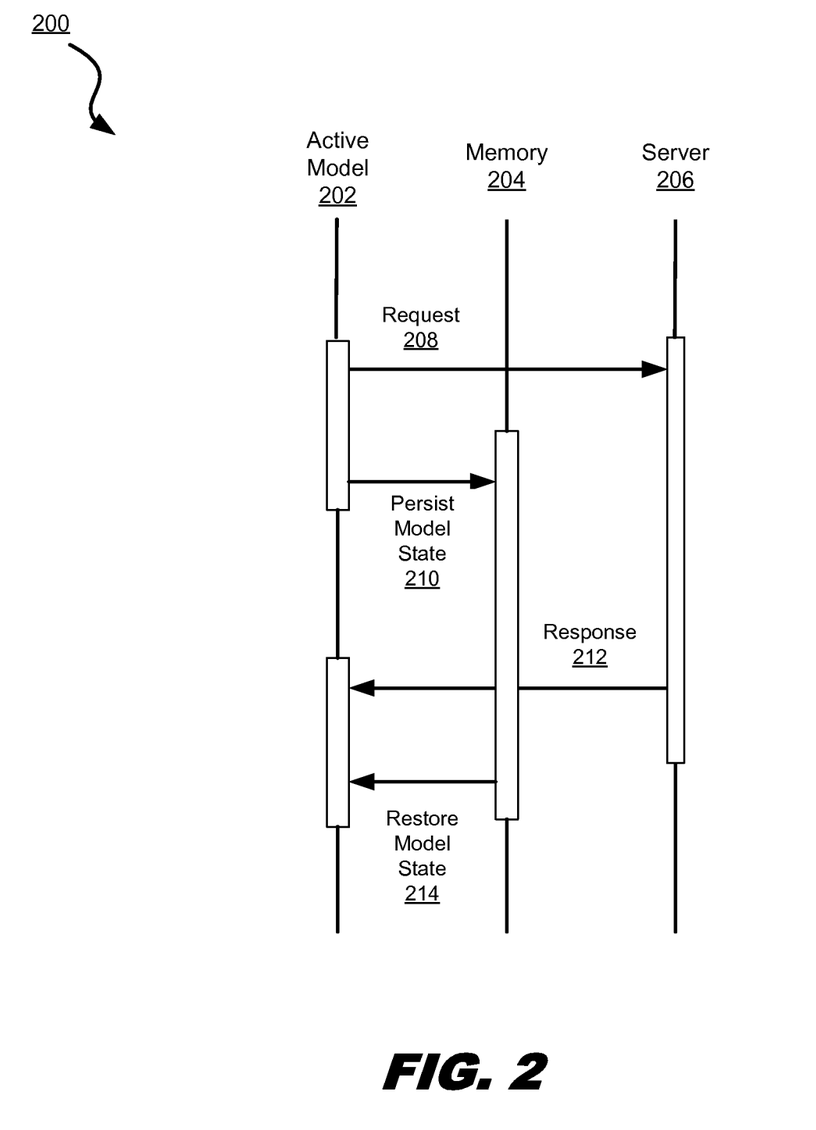
FIG. 2 is a flow diagram illustrating a state save and restore method, in accordance with various examples of the present disclosure.

FIG. 2 is a flow diagram illustrating a state save and restore method 200, according to some examples of the present disclosure.

The method 200 includes an active model 202 of an application, a memory 204 and a server 206. The active model 202 includes properties of a model on first machine that are identified as corresponding to a first state. In some examples, the active model 202 includes all properties of the model. In other examples, the active model 202 includes all properties of the model that have changed since the previous state. In yet other examples, the active model 202 includes a subset of the properties of the model, where the subset is pre-configured by a software developer or user-defined.

At step 208, a request is sent from the active model 202 to the server 206. For example, if the active model 202 pertains to properties of an e-mail application, the request may be an email that is sent to the server 206 and a property of the active model 202 may be the message included in the email. In other examples, the request is any request that is sent from the active model 202 to the server 206. In the present example, a state identifier corresponding to the state of the active model 202 at a particular point in time is associated with the request 208 and sent to the server 206.

At step 210, after sending the request, a state save method is executed to save the active model 202 by persisting the active model state to the memory 204 as a state of the active memory 202 at a particular point in time. In other examples, the state save method may be executed prior to, or at the time of, sending the request. In the present example, storing/persisting the active model state to the memory 204 includes serializing one or more objects, including one or more properties of the objects, corresponding to the active model and writing the serialized objects and their properties to a database. In the present example, the memory 204 includes a database stored in a persistent memory. In the present example, the state of the active model 202 that is stored to the memory is associated with a state identifier, with the state identifier being used as a key to identify and locate the state in the memory.

In the present example, active model 202 may change between persisting the state at 210 and receiving the server response at 212. In some examples, after sending the request to the server 206, the active model 202 may be designed to optimistically assume that the request 208 sent to the server 206 is successfully processed. Accordingly, the active model 202 may continue to accept input as though the server 206 has processed the request 208 successfully. For example, using the prior example of the email request, the client may assume that the email was successfully sent by the server, and place the email in a sent items folder. The active model 202 and its corresponding view may therefore have changed based on the optimistic assumption of success.

Next, the server 206 sends its response 212 to the request 208. In the present example, the response 212 includes the state identifier, or some variation thereof, that was sent in association with the request 208. The response 212 may be, for example, an error message. For example, using the prior example of the email request, the response 212 may indicate that the server 206 was unable to send the email that the server 206 received in the request 208. Accordingly, since the transaction was not successful on the server-side, the active model 202 of the application and its associated view may no longer properly reflect the state of the transaction. In this example, the email should not have been moved to the sent items folder, as the email was not sent by the server.

In the present example, the response 212 is received and parsed to determine the state identifier associated with the response 212. In some examples, the response 212 is processed by a controller and/or a state manager that is associated with the active model 202.

Next, the state identifier received with the response 212 is used to query the database to identify a matching key. The state associated with this key is restored. In the present example, the state is restored into the active model 202 by fetching the state from the memory 204, deserializing the state, and applying the state to the active model 202. In some examples, a state manager performs this functionality. In some examples, the state is applied into the active model 202 by writing the data values corresponding to the properties of the deserialized state into the data values corresponding to the properties of the active model 202.

In the present example, after restoring the model state at 214, the state of the active model matches the state of the active model at the time the active model persisted to the memory at 210, thus reversing any optimistic updates that were implemented in the active model 202 and its associated view. For example, in the earlier discussed email example, the properties of the active model 202 may be updated to reflect the state immediately following the request 208. These updates are propagated to the view, such that the view shows the email as not being included in the sent items folder. If the response 212 indicated an error, the model and view may then be updated to correctly identify the failure to send the email. For example, a dialogue may be displayed to a user identifying that the server 206 was unable to send the email message. Accordingly, as described in these examples, persisting a state of the model to a memory allows for the state of an application to be stored at a particular point in time, such that this state may be later restored from the memory by applying the stored state to the model.

Figure 3:
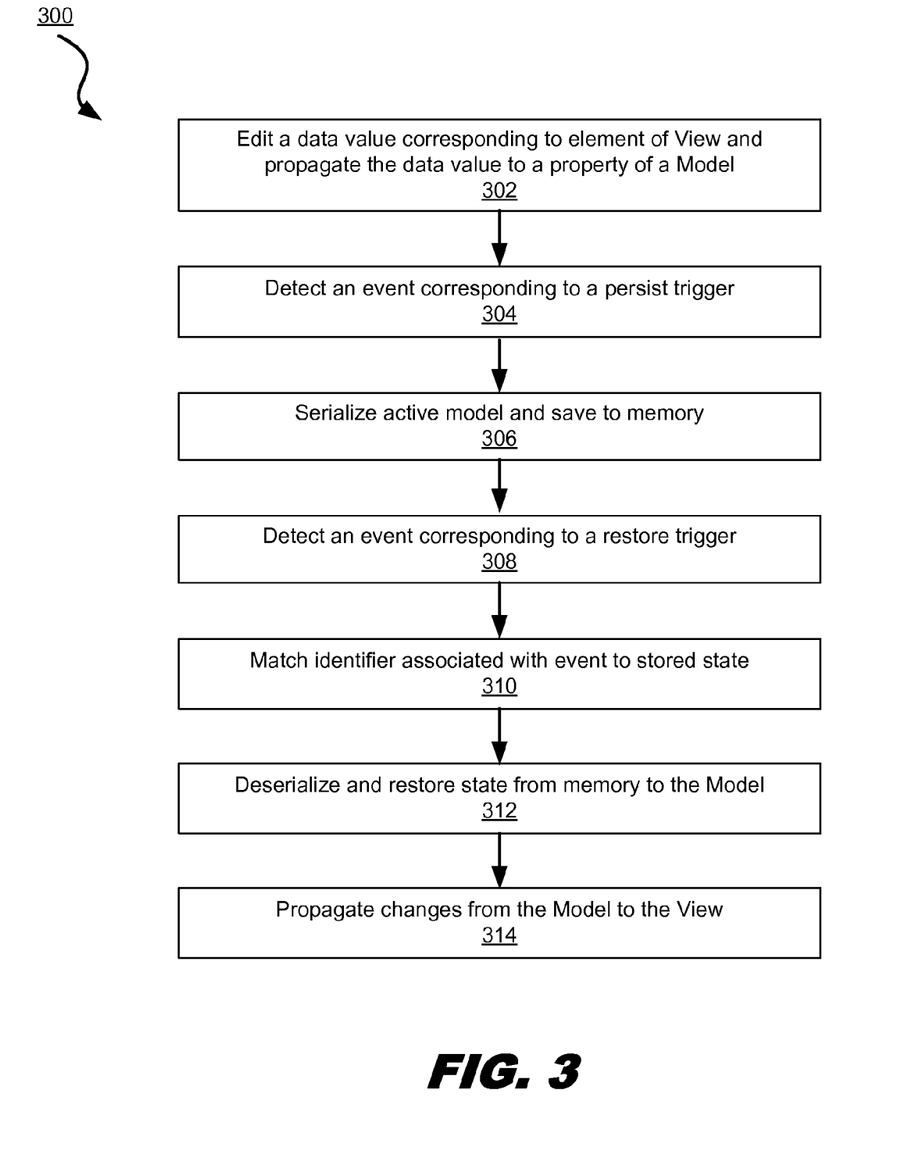
FIG. 3 is a flow diagram illustrating a method for storing and restoring a state, in accordance with various examples of the present disclosure.

FIG. 3 is a flow diagram illustrating a method for storing and restoring a state, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 302, a data value corresponding to an element of the view is modified. In some examples, the data value may be entered/edited by one or more users. For example, a view may be a user interface that includes view elements such as a window and a text box within the window. In this example, a user may enter text into the text box, therefore modifying a data value corresponding to the text box element. In another example, an element of the view may be modified based on receiving an input from a remote machine. In yet another example, the modifying of the data value may be the closing of the window element, thereby changing the data value corresponding to the window to indicate that the window is closed.

In the present example, the elements of the view are bound to properties of the model, such that modifying the elements of the view causes the properties of the model to be similarly updated. The updating of the properties of the model responsive to the view element updates is referred to as "propagating" the view element updates to the properties of the model. For example, an element of a view may be updated so that its data value is set to a user specified data value. The data value is then propagated to a corresponding property of the model, such that the data value of the property is also updated to the user specified data value.

At block 304, the modification corresponding to the view element causes an event to be sent to the state manager. In some examples, the event is sent from the view. In other examples, the event is sent from a controller. The event is received by the state manager, which detects and parses the event. The state manager parses the event to determine whether the event is a trigger for a state persist operation. In some examples, the application defines the triggers that cause the state to be persisted. In other examples, the triggers are user defined. For example, closing a window may trigger a persisting of a state to a memory, but moving a mouse may not trigger a persisting of the state to a memory.

At block 306, based on a persist operation being triggered, the state manager determines the active model. In some examples, the active model is pre-configured to include the entire model or to a subset of the active model. For example, a subset of the properties of the model may include an indicator that specifies that the properties are included in the active model. An indicator may be, for example, a bit or variable that is toggled corresponding to a property. In other examples, the active model includes the properties of the model that have been modified since a previous state change. In some examples, the state manager performs dirty checking to determine the active model by comparing properties with previously saved properties to identify any properties that have changed. In other examples, each property may be associated with a method that is triggered when the property is modified, such that the active model is determined based on a method being triggered for a property.

After determining the active model, the active model is serialized. In some examples, serialization includes converting one or more objects of the active model to a sequence of bytes that includes the object's data (such as the properties in the active model and their type). The serialized active model is then stored to a memory, which may be a runtime or a persistent memory. In some examples, the active model includes instances of class objects that each include properties. In this example, each of the class objects that includes properties that are part of the active model are serialized to convert the class objects to a sequence of bytes.

In the present example, the state manager determines a state identifier that is associated with the serialized active model in the memory. In some examples, the state identifier may be incremented with each state save, such that each state stored in the memory is associated with a unique identifier. For example, a counter may be maintained in memory that is retrieved and incremented. In other examples, the state identifier may be derived from or correspond to an identifier received with the event. For example, the event may include an event identifier, which is retrieved and selected as a state identifier. In yet other examples, the state identifier is a serialized state hash value, such as a checksum.

In the present example, the view and/or model may be modified in the interim between storing the active model and receiving an event that triggers a restore of the active model. For example, a user may send a request to a server, which triggers an operation to persist the active model state to the memory. The user may then continue to modify the view and the model by editing data values of the model and view.

At block 308, an event is sent to the state manager. In some examples, the event may be sent by the controller or the view. In some examples, the event corresponds to a response received from another machine. In other examples, the event corresponds to a modification of an element of the view (e.g., opening or closing a window, modifying a data value of an element within the window, and so forth). The state manager detects and parses the event.

The state manager parses the event to determine whether the event is a trigger of a restore operation. In some examples, the application defines the triggers that cause the state to be restored. In other examples, the triggers are user defined. For example, a developer may identify the modification of some view elements as causing triggering a state restore, but not others. For example, opening a window or receiving an error may trigger a restore operation, but not closing a window or typing a text entry into a text box. The event may be associated with a state identifier. For example, an error message received from a server may identify a state identifier that the state manager may use to select state a particular state in memory for restoration.

In other examples, users may trigger a state restore operation by manually selecting a particular state to restore using an interface, or by selecting an option from an interface to restore the most recently persisted state.

At block 310, the state identifier associated with the event or user selection is matched with one or more stored state identifiers in the memory. For example, if the previous states are stored in a database as values that correspond to state identifier keys, the state identifier may be used in a query of the database keys to locate a matching state identifier key in the database.

The state associated with the matching state identifier is deserialized. Deserializing of the state refers to converting a sequence of bytes of the state to one or more objects. In the present example, the one or more objects include properties that are associated with data values. The properties of the model may then be applied to the properties of the one or more deserialized objects, such that the model is restored to having the same data values assigned to its properties as it had at the time the state was persisted. For example, the properties of the model may have their data values replaced with the data values of the properties that have been deserialized from the state stored in the memory.

At block 314, the data values of the properties of the model are propagated to the elements of the view. In some examples, propagating a data value of a property to a data value corresponding to an element of the view is performed using a write or copy operation. Accordingly, the view is updated to display a user interface that corresponds to the user interface that was displayed at the time the state was persisted.

Figure 4:
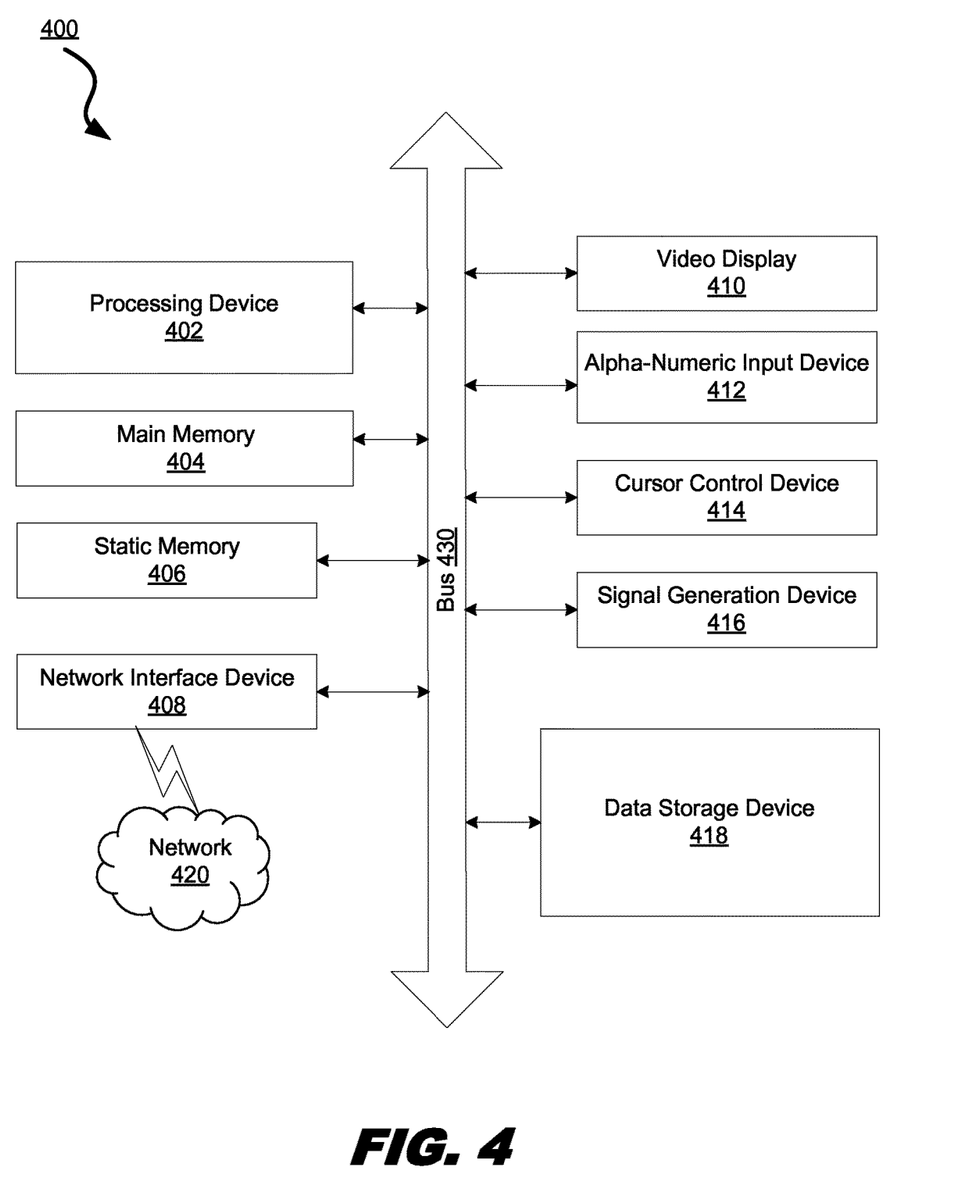
FIG. 4 is a block diagram illustrating a computer system that may perform one or more of the operations described herein.

FIG. 4 illustrates a diagram of a machine in the form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for user interface state saving and restoration, the method comprising:
   receiving a first data value from a user, the first data value corresponding to an element of a view;
   propagating the first data value to a property of a model;
   detecting a first event, the first event corresponding to the view;
   identifying one or more properties corresponding to the model, the one or more properties including the property;
   serializing the one or more properties to a memory as a stored model;
   associating the stored model with a state identifier, the associating including incrementing the state identifier;
   detecting a second event, wherein the second event is associated with a second state identifier the detecting of the second event further comprising:
      determining that the state identifier matches the second state identifier; and
      restoring the stored model;
   deserializing the stored model, the deserializing including applying one or more data values of the stored model to the one or more properties; and
   propagating a data value of the one or more data values to the element of the view, wherein the data value corresponds to the first data value.

2. The method of claim 1, wherein the state identifier is stored in a database in the memory as a key, wherein the stored model is stored in the database, wherein the database associates the key with the stored model.

3. The method of claim 1, the identifying of the one or more properties corresponding to the model further comprising at least one of the following: (i) comparing a current data value of each of the one or more properties with a previous data value of each of the one or more properties and (ii) listening for a data value change corresponding to at least one of the one or more properties.

4. The method of claim 1, wherein the memory is a runtime memory.

5. The method of claim 1, wherein the memory is a persistent memory.

6. The method of claim 1, further comprising:
   binding the element to the property, wherein the binding is a two-way binding.

7. The method of claim 1, wherein the first event corresponds to at least one of: (i) closing a window, (ii) sending the first data value to another machine, and (iii) receiving or modifying the first data value.

8. A non-transitory computer-readable medium, comprising computer-readable instructions for user interface state saving and restoring leveraging two-way data-binding, the computer-readable instructions executable by a processor to cause the processor to:
   propagate a user input from a first element of a view to a first property of a model;
   detect a first event;
   based on the first event, trigger a persist state operation, the persist state operation including:
      identifying one or more properties corresponding to an active model, the one or more properties including the first property;
      storing the one or more properties in a memory as a state, the storing including serializing the one or more properties; and
      associating the state with a state identifier, the associating including incrementing the state identifier;
   detect a second event, wherein the second event is associated with a second state identifier the detecting of the second event including:
      determining that the state identifier is a match with the second state identifier; and
      based on the determining of the match selecting the state;
   based on the second event, trigger a restore state operation, the restore state operation including:

applying the state to the model, the applying including deserializing the state to obtain the one or more properties; and propagating the one or more properties to one or more elements of the view, the one or more elements including the first element.

9. The non-transitory computer-readable medium of 10, wherein the memory includes a database, wherein the state identifier is stored in the database as a key, wherein the state is stored in the database as a value associated with the key.

10. The non-transitory computer-readable medium of claim 8, the identifying of the one or more properties corresponding to the active model further comprising at least one of the following: (i) comparing a current data value of each of the one or more properties with a previous data value of each of the one or more properties and (ii) listening for a data value change corresponding to at least one of the one or more properties.

11. The non-transitory computer-readable medium of claim 8, wherein the first event corresponds to a sending of a data value to another machine.

12. A system including a user interface, the system comprising:

a processor and a memory;

an application including a model, a view, and a two-way binding between the model and the view;

the view to receive a user input;

the model to store the user input as a first property;

the application further including a state manager, the state manager executed by the processor to:

retrieve one or more properties of the model, the one or more properties including the first property;

serialize and store the one or more properties in the memory as a state;

associate the state with a state identifier, the associating including incrementing the state identifier; and deserialize the one or more properties from the memory, the deserializing including:

determining that the state identifier matches a second state identifier;

restoring the model; and applying the one or more properties to the model.

13. The system of claim 12, the applying further comprising: propagating the one or more properties to one or more elements of the view.

14. The system of claim 12, wherein the memory includes a database, wherein the state identifier is stored in the database as a key, wherein the state is stored in the database, wherein the state is associated with the key.

15. The system of claim 12, the retrieving of the one or more properties of the model further comprising:

selecting the one or more properties based on at least one of: (i) comparing a current data value of each of the one or more properties with a previous data value of each of the one or more properties, and (ii) listening for a data value change corresponding to at least one of the one or more properties.

16. The system of claim 13, wherein the two-way binding comprises (i) a mapping of the one or more elements of the view to the one or more properties of the model and (ii) a mapping of the one or more properties of the model to one or more elements of the view.

* * * * *